United States Patent
Ishikawa et al.

(10) Patent No.: US 11,972,248 B2
(45) Date of Patent: Apr. 30, 2024

(54) CONTROLLING SOFTWARE UPDATE OF ELECTRONIC CONTROL UNITS MOUNTED ON A VEHICLE

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 106 days.

(21) Appl. No.: 17/805,339

(22) Filed: Jun. 3, 2022

(65) Prior Publication Data
US 2023/0004376 A1  Jan. 5, 2023

(30) Foreign Application Priority Data

Jul. 5, 2021  (JP) ................................. 2021-111639

(51) Int. Cl.
*G06F 8/65* (2018.01)
*G06F 8/61* (2018.01)
*G07C 5/00* (2006.01)

(52) U.S. Cl.
CPC .................. *G06F 8/65* (2013.01); *G06F 8/61* (2013.01); *G07C 5/008* (2013.01)

(58) Field of Classification Search
None
See application file for complete search history.

(56) References Cited

U.S. PATENT DOCUMENTS

| | | | | |
|---|---|---|---|---|
| 2011/0016531 A1* | 1/2011 | Yeung | ..................... | G06F 21/12 717/124 |
| 2014/0075197 A1* | 3/2014 | Alrabady | ................ | G06F 21/57 713/176 |
| 2018/0131700 A1* | 5/2018 | Ando | ..................... | H04L 63/162 |
| 2018/0217942 A1* | 8/2018 | Fons | .................... | G06F 12/1408 |
| 2018/0232223 A1* | 8/2018 | Madrid | ..................... | G06F 8/71 |
| 2019/0268367 A1* | 8/2019 | Willis | ................. | H04L 63/1425 |
| 2020/0211301 A1* | 7/2020 | Zhang | ................... | H04L 63/065 |
| 2020/0213287 A1* | 7/2020 | Zhang | ................ | H04L 12/40045 |
| 2020/0348924 A1* | 11/2020 | Park | ....................... | H04L 9/3268 |

FOREIGN PATENT DOCUMENTS

| JP | 2004-326689 A | 11/2004 |
|---|---|---|
| JP | 2005-252458 A | 9/2005 |
| JP | 2009-59186 A | 3/2009 |
| JP | 2018-45515 A | 3/2018 |

* cited by examiner

*Primary Examiner* — Qing Chen
(74) *Attorney, Agent, or Firm* — Oblon, McClelland, Maier & Neustadt, L.L.P.

(57) ABSTRACT

A center configured to communicate with an OTA master configured to control software update for electronic control units mounted on a vehicle includes one or more processors. The one or more processors are configured to store security information in which security levels required for the software update are associated with the electronic control units mounted on the vehicle, respectively, and generate a distribution package applied encryption at the security level associated with a target electronic control unit based on the security information. The target electronic control unit is an electronic control unit that is a target of the software update.

14 Claims, 6 Drawing Sheets

| ELECTRONIC CONTROL UNIT | SECURITY LEVEL |
|---|---|
| A | 1 |
| B | 2 |
| C | 3 |
| D | 1 |
| E | 3 |
| ... | ... |

CONTROLLING SOFTWARE UPDATE OF ELECTRONIC CONTROL UNITS MOUNTED ON A VEHICLE

CROSS-REFERENCE TO RELATED APPLICATION

This application claims priority to Japanese Patent Application No. 2021-111639 filed on Jul. 5, 2021, incorporated herein by reference in its entirety.

BACKGROUND

1. Technical Field

The present disclosure relates to a center that controls software update of electronic control units, and relates to an over-the-air (OTA) master, a method, a non-transitory storage medium, and a vehicle.

2. Description of Related Art

Vehicles include a plurality of electronic control units configured to control operations of the vehicles. The electronic control unit includes a processor, a transitory storage unit such as a random-access memory (RAM), and a non-volatile memory that is a non-volatile storage unit such as a flash read-only memory (ROM). The processor implements control functions of the electronic control unit by executing software stored in the non-volatile memory. The software stored in each electronic control unit is rewritable. Software update to a newer version of the software enables improvement in the functions of the electronic control unit and addition of new vehicle control functions.

An over-the-air (OTA) technology is known as a technology for updating software of electronic control units. In the OTA technology, a device that handles a software update process for a vehicle is wirelessly connected both to an in-vehicle communication device connected to an in-vehicle network and to a communication network such as the Internet. The device that handles the software update process for the vehicle downloads software from a server through wireless communication and installs the downloaded software into the electronic control unit to update or add the software for the electronic control unit (see, for example, Japanese Unexamined Patent Application Publication No. 2004-326689 (JP 2004-326689 A)).

SUMMARY

The electronic control units mounted on the vehicle include electronic control units related to traveling, such as an electronic control unit that controls motion of the vehicle and an electronic control unit for meters, and electronic control units unrelated to traveling, such as an electronic control unit for entertainment. Therefore, when the security level (encryption level) of a distribution package including data and information necessary for updating software is set uniformly based on the electronic control units related to traveling, the load of the distribution package decryption process increases. That is, the period required for software update increases. Thus, there is room for improvement in the setting of the security level of the distribution package.

The present disclosure provides a center, an OTA master, a method, a non-transitory storage medium, and a vehicle, that are capable of appropriately transmitting and receiving a distribution package by dynamically setting a security level depending on an electronic control unit to be updated.

A first aspect of the technology of the present disclosure relates to a center configured to communicate with an OTA master configured to control software update for electronic control units mounted on a vehicle. The center includes one or more processors. The one or more processors are configured to store security information in which security levels required for the software update are associated with the electronic control units mounted on the vehicle, respectively. The one or more processors are configured to generate a distribution package applied encryption at a security level associated with a target electronic control unit based on the security information. The target electronic control unit is an electronic control unit that is a target of the software update.

In the center according to the first aspect of the technology of the present disclosure, the one or more processors may be configured to receive, from the vehicle, version information indicating a version of software of each of the electronic control units. The one or more processors may be configured to determine whether the target electronic control unit is present based on the version information. The one or more processors may be configured to, when the one or more processors determine that the target electronic control unit is present, generate the distribution package applied the encryption at the security level associated with the target electronic control unit based on the security information. The one or more processors may be configured to transmit the distribution package to the OTA master based on a request from the OTA master.

In the center according to the first aspect of the technology of the present disclosure, the one or more processors may be configured to generate the distribution package including information that specifies a method for the encryption.

In the center according to the first aspect of the technology of the present disclosure, the one or more processors may be configured to, when the security level associated with the target electronic control unit is equal to or higher than a predetermined threshold, generate the distribution package applied the encryption based on information unique to the vehicle.

In the center according to the first aspect of the technology of the present disclosure, the one or more processors may be configured to, when the security level associated with the target electronic control unit is lower than a predetermined threshold, generate the distribution package applied the encryption based on information common to a plurality of the vehicles.

In a second aspect of the technology of the present disclosure, an OTA master configured to control software update for electronic control units mounted on a vehicle includes one or more processors. The one or more processors are configured to receive, from a center, a distribution package applied encryption at a security level associated with a target electronic control unit. The target electronic control unit is an electronic control unit that is a target of the software update. The one or more processors are configured to control the software update for the target electronic control unit based on the received distribution package.

In the OTA master according to the second aspect of the technology of the present disclosure, the one or more processors may be configured to transmit, to the center, version information indicating a version of each of the electronic control units mounted on the vehicle. The one or more processors may be configured to receive, from the center, the distribution package applied the encryption at the security level associated with the target electronic control unit based on the version information.

In the OTA master according to the second aspect of the technology of the present disclosure, the one or more processors may be configured to decrypt the distribution package based on information that is included in the distribution package and specifies a method for the encryption.

In the OTA master according to the second aspect of the technology of the present disclosure, the one or more processors may be configured to decrypt the distribution package based on information unique to the vehicle.

In the OTA master according to the second aspect of the technology of the present disclosure, the one or more processors may be configured to decrypt the distribution package based on information common to a plurality of the vehicles.

A third aspect of the technology of the present disclosure relates to a method to be executed by a center configured to communicate with an OTA master configured to control software update for electronic control units mounted on a vehicle. The OTA master includes one or more processors and a memory. The method includes storing security information in which security levels required for the software update are associated with the electronic control units mounted on the vehicle, respectively, and generating a distribution package applied encryption at a security level associated with a target electronic control unit based on the security information. The target electronic control unit is an electronic control unit that is a target of the software update.

A fourth aspect of the technology of the present disclosure relates to a method to be executed by an OTA master configured to control software update for electronic control units mounted on a vehicle. The OTA master includes one or more processors and a memory. The method includes receiving, from a center, a distribution package applied encryption at a security level associated with a target electronic control unit. The target electronic control unit is an electronic control unit that is a target of the software update. The method includes controlling the software update for the target electronic control unit based on the received distribution package.

The center according to the first aspect of the technology of the present disclosure may further include a non-transitory storage medium storing instructions that are executable by the one or more processors and that cause the one or more processors to perform functions. The functions may include storing the security information in which the security levels required for the software update are associated with the electronic control units mounted on the vehicle, respectively, and generating the distribution package applied the encryption at the security level associated with the target electronic control unit based on the security information.

The OTA master according to the second aspect of the technology of the present disclosure may further include a non-transitory storage medium storing instructions that are executable by the one or more processors and that cause the one or more processors to perform functions. The functions may include receiving, from the center, the distribution package applied the encryption at the security level associated with the target electronic control unit, and controlling the software update for the target electronic control unit based on the received distribution package.

The OTA master according to the second aspect of the technology of the present disclosure may be mounted on a vehicle.

According to the present disclosure, the center sets the security level for the distribution package depending on, for example, the type of the electronic control unit to be updated during the software update. Thus, the distribution package at the security level appropriate to the electronic control unit to be updated can be distributed to the OTA master.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In the present disclosure, a center prestores information in which a security level required for software update is associated with each electronic control unit mounted on a vehicle. When the center receives an update data download request from an OTA master, the center generates a distribution package encrypted at the security level associated with the electronic control unit to be updated, and transmits the distribution package to the OTA master. Through this process, the software update can be executed at the security level required in the electronic control unit to be updated.

An embodiment of the present disclosure will be described below in detail with reference to the drawings.

Embodiment

Configuration

Figure 1:
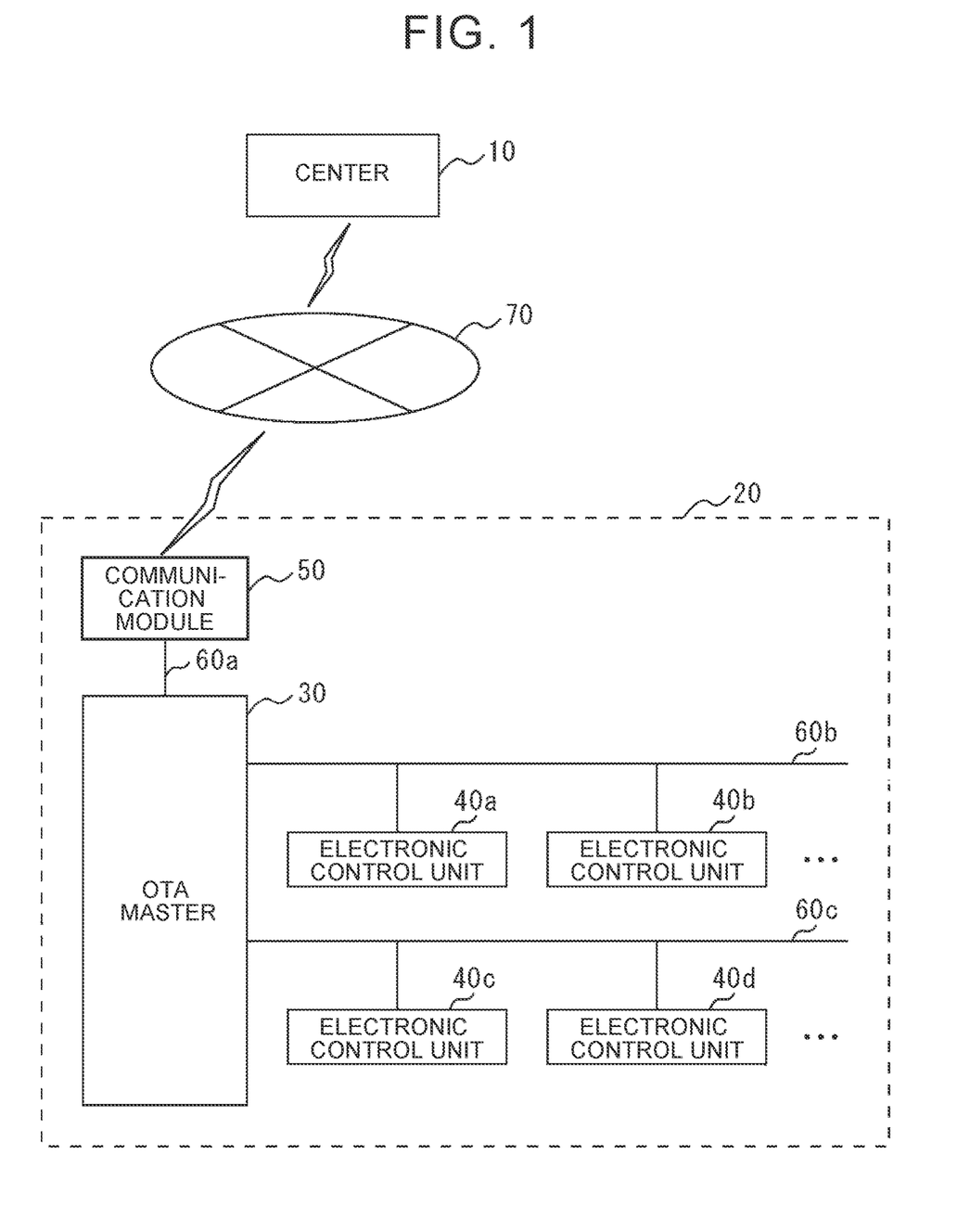
FIG. 1 is a block diagram showing an overall configuration of a network system according to an embodiment.

FIG. 1 is a block diagram showing an overall configuration of a network system according to the embodiment of the present disclosure. The network system shown in FIG. 1 is a system for updating software of a plurality of electronic control units 40a to 40d mounted on a vehicle. The network system includes a center 10 outside the vehicle, an in-vehicle network 20 constructed inside the vehicle, and a network 70.

(1) Center

The center 10 is communicable, via the network 70, with an OTA master 30 described later in the in-vehicle network 20. The center 10 transmits software update data of the electronic control units 40a to 40d to the OTA master 30 and receives a notification about progress of a software update process from the OTA master 30. The center 10 can control and manage the software update of the electronic control units 40a to 40d connected to the OTA master 30. The center 10 has functions of a so-called server.

Figure 2:
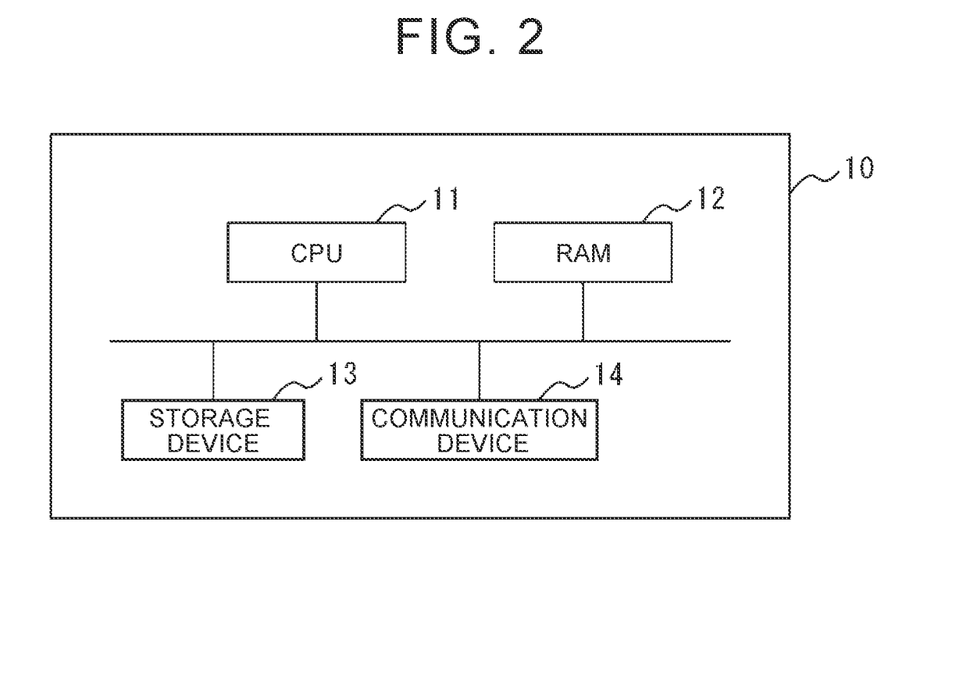
FIG. 2 is a block diagram showing a schematic configuration of a center.

FIG. 2 is a block diagram showing a schematic configuration of the center 10 in FIG. 1. As shown in FIG. 2, the center 10 includes a central processing unit (CPU) 11, a random-access memory (RAM) 12, a storage device 13, and a communication device 14. The storage device 13 includes a readable/writable storage medium such as a hard disk drive (HDD) or a solid state drive (SSD). For example, the storage device 13 stores programs for executing software update management, information to be used for software update control and software update management, and software update data of each electronic control unit. In the center 10, the CPU 11 executes the program read from the storage device 13 by using the RAM 12 as a work area to execute a predetermined process related to software update. The communication device 14 communicates with the OTA master 30 via the network 70.

Figure 3:
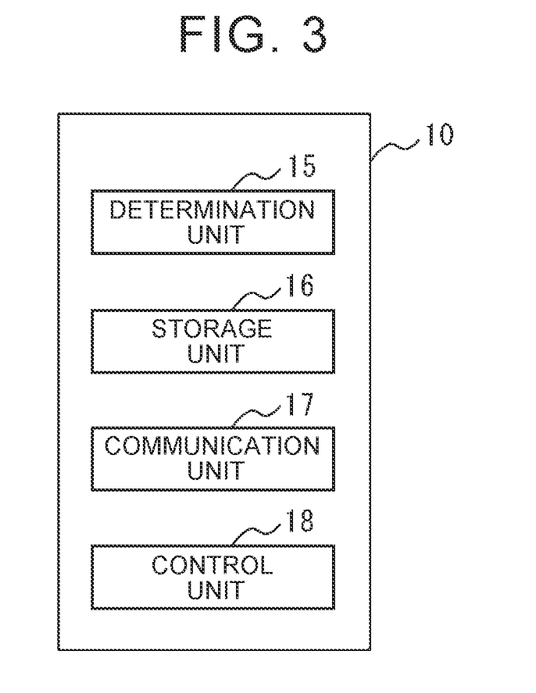
FIG. 3 is a functional block diagram of the center.

FIG. 3 is a functional block diagram of the center 10 shown in FIG. 2. The center 10 shown in FIG. 3 includes a determination unit 15, a storage unit 16, a communication unit 17, and a control unit 18. The storage unit 16 is implemented by the storage device 13 shown in FIG. 2. The determination unit 15, the communication unit 17, and the control unit 18 are implemented by the CPU 11 in FIG. 2 executing the programs stored in the storage device 13 by using the RAM 12.

Figure 4:
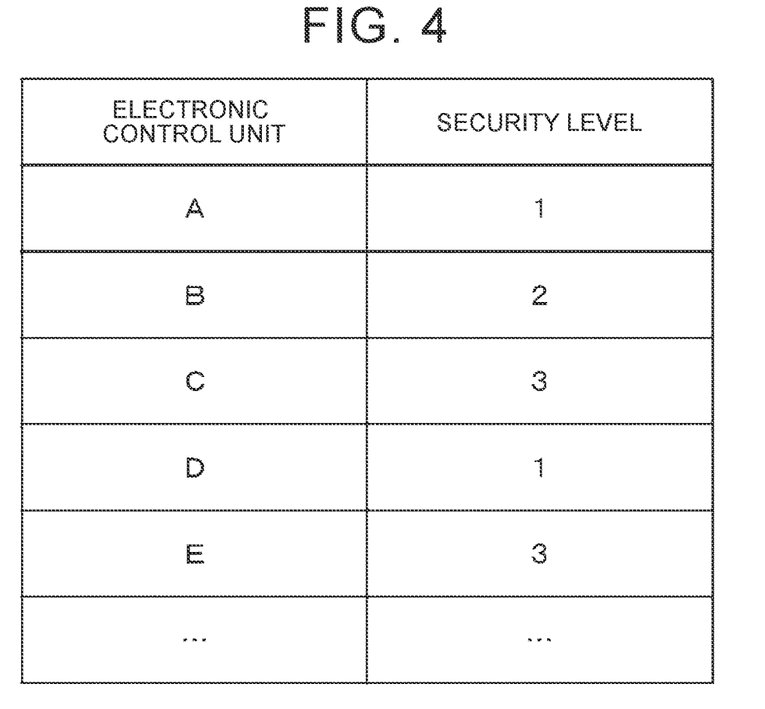
FIG. 4 shows an example of security information to be stored in the center.

The storage unit 16 stores information related to the software update process of one or more electronic control units mounted on the vehicle. As the information related to the software update process, the storage unit 16 stores at least update management information and software update data of the electronic control units 40a to 40d. The update management information is information in which information indicating software available for the electronic control units 40a to 40d is associated with vehicle identification information (vehicle ID) for identifying the vehicle. Examples of the information indicating software available for the electronic control units 40a to 40d include a combination of pieces of latest version information of software products of the electronic control units 40a to 40d. As the information related to the software update process, the storage unit 16 stores security information in which a security level required for software update is associated with each electronic control unit mounted on the vehicle. FIG. 4 shows an example of the security information stored in the storage unit 16. In the security information exemplified in FIG. 4, the electronic control units mounted on the vehicle and security levels required for software update are associated with each other. For example, the security level can be changed depending on whether the electronic control unit is an electronic control unit related to traveling, such as an electronic control unit that controls the vehicle (for a power train, a brake, steering, and the like) or an electronic control unit that presents conditions of the vehicle (for meters and the like), or is an electronic control unit that is not so related to traveling, such as an electronic control unit that provides entertainment contents (for multimedia and the like). That is, the security level can be changed depending on the type of the electronic control unit. As a specific example, a relatively high security level is set for the electronic control unit related to traveling. The security level of the electronic control unit that is not so related to traveling can be set to a relatively low security level (lower than the security level of the electronic control unit related to traveling). As the information related to the software update process, the storage unit 16 can also store a status of the software update being executed in the vehicle. The storage unit 16 can further store information related to the type of a non-volatile memory mounted on each of the electronic control units 40a to 40d.

The communication unit 17 functions as a transmission unit and a reception unit that transmit and receive data, information, requests, or the like to and from the OTA master 30. The communication unit 17 receives a software update check request from the OTA master 30 (reception unit). For example, the update check request is transmitted from the OTA master 30 to the center 10 when power supply or ignition is turned ON (hereinafter referred to as "powered ON") in the vehicle. The update check request is information for requesting the center 10 to check whether there is update data of the electronic control units 40a to 40d based on vehicle configuration information described later. In response to the update check request received from the OTA master 30, the communication unit 17 transmits information indicating the presence or absence of update data to the OTA master 30 (transmission unit). The communication unit 17 also receives a distribution package transmission request (download request) from the OTA master 30 (reception unit). In response to the reception of the distribution package download request, the communication unit 17 transmits, to the OTA master 30, a distribution package including the software update data of the electronic control units 40a to 40d and encrypted at a security level associated with the electronic control unit to be updated (described later).

When the communication unit 17 receives the update check request from the OTA master 30, the determination unit 15 determines whether there is software update data for the electronic control units 40a to 40d mounted on the vehicle identified by the vehicle ID included in the update check request based on the update management information (for example, versions of the electronic control units) stored in the storage unit 16. A result of the determination made by the determination unit 15 as to whether there is update data is transmitted to the OTA master 30 by the communication unit 17.

When the determination unit 15 determines that there is software update data for the electronic control units 40a to 40d and a distribution package download request is received from the OTA master 30, the control unit 18 generates a distribution package including the update data to be transmitted to the OTA master 30. At this time, the control unit 18 generates a distribution package encrypted at a predetermined security level based on the security information stored in the storage unit 16 and information on the electronic control unit to be updated that is determined by the determination unit 15. The distribution package may include information that specifies an encryption method. The encryption based on the security level will be described later.

(2) In-Vehicle Network

The in-vehicle network 20 includes the OTA master 30, the electronic control units 40a to 40d, and a communication module 50. The OTA master 30 and the communication module 50 are connected via a bus 60a. The OTA master 30 and the electronic control units 40a and 40b are connected via a bus 60b. The OTA master 30 and the electronic control units 40c and 40d are connected via a bus 60c.

The OTA master 30 can wirelessly communicate with the center 10 via the bus 60a, the communication module 50, and the network 70. The OTA master 30 manages an OTA status. The OTA master 30 has a function of controlling an update sequence that is a flow of the software update process and updating software of an electronic control unit to be updated (hereinafter referred to as "target electronic control unit"). The OTA master 30 controls the software update of the target electronic control unit among the electronic control units 40a to 40d based on, for example, the update data acquired from the center 10. The OTA master 30 may also be referred to as "central gateway (CGW)". One or more target electronic control units may function as the OTA master 30.

Figure 5:
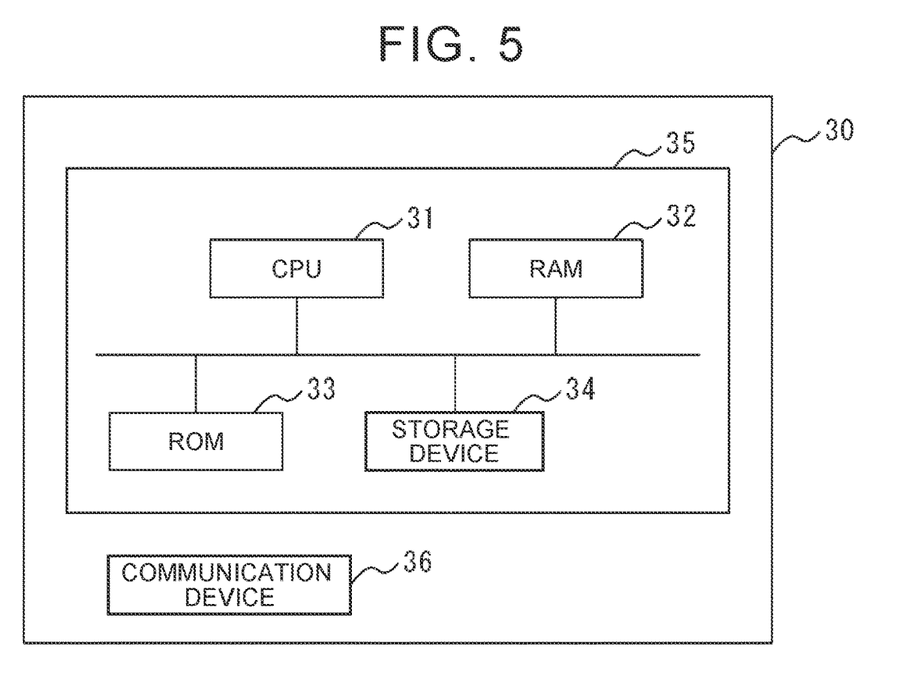
FIG. 5 is a block diagram showing a schematic configuration of an OTA master.

FIG. 5 is a block diagram showing a schematic configuration of the OTA master 30 in FIG. 1. As shown in FIG. 5, the OTA master 30 includes a CPU 31, a RAM 32, a read-only memory (ROM) 33, a storage device 34, and a communication device 36. The CPU 31, the RAM 32, the ROM 33, and the storage device 34 constitute a microcomputer 35. In the OTA master 30, the CPU 31 executes a program read from the ROM 33 by using the RAM 32 as a work area to execute a predetermined process related to software update. The communication device 36 communicates with the communication module 50 and the electronic control units 40a to 40d via the buses 60a to 60c shown in FIG. 1.

Figure 6:
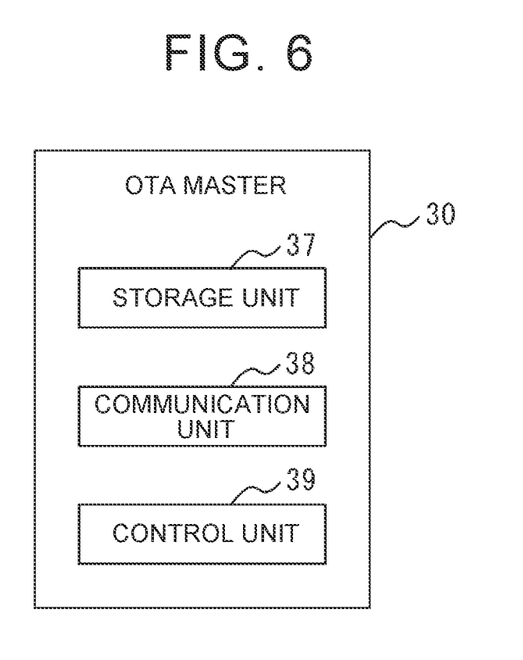
FIG. 6 is a functional block diagram of the OTA master.

FIG. 6 is a functional block diagram of the OTA master 30 shown in FIG. 5. The OTA master 30 shown in FIG. 6 includes a storage unit 37, a communication unit 38, and a control unit 39. The storage unit 37 is implemented by the storage device 34 shown in FIG. 5. The communication unit 38 and the control unit 39 are implemented by the CPU 31 in FIG. 5 executing programs stored in the ROM 33 by using the RAM 32.

The storage unit 37 stores, for example, a program for executing software update of the electronic control units 40a to 40d (control program for the OTA master 30), various types of data to be used when executing the software update, and software update data downloaded from the center 10. The storage unit 37 can also store information related to the type of the non-volatile memory mounted on each of the electronic control units 40a to 40d. The storage unit 37 may prestore an encryption method applied to a distribution package to be transmitted from the center 10.

The communication unit 38 functions as a transmission unit and a reception unit that transmit and receive data, information, requests, or the like to and from the center 10. For example, the communication unit 38 transmits a software update check request to the center 10 when the vehicle is powered ON (transmission unit). For example, the update check request includes the vehicle ID for identifying the vehicle, and version information related to current software versions of the electronic control units 40a to 40d connected to the in-vehicle network 20. The update check request may also include information related to the types of the electronic control units 40a to 40d connected to the in-vehicle network 20. The vehicle ID and the current software versions of the electronic control units 40a to 40d are used to determine whether there is software update data for the electronic control units 40a to 40d by making comparison with the latest software versions held in the center 10 for each vehicle ID. The information related to the types of the electronic control units 40a to 40d can be used by the center 10 to determine the security level of a distribution package. The communication unit 38 receives a notification about the presence or absence of update data from the center 10 as a response to the update check request (reception unit). When there is software update data for the electronic control units 40a to 40d, the communication unit 38 transmits a download request for a distribution package of the software update data to the center 10 (transmission unit). The communication unit 38 receives (downloads) the distribution package transmitted from the center 10 based on control of the control unit 39 (reception unit). The communication unit 38 transmits, to the center 10, software update statuses received from the electronic control units 40a to 40d (transmission unit).

The control unit 39 determines whether there is software update data for the electronic control units 40a to 40d based on the response to the update check request that is received from the center 10 by the communication unit 38. The control unit 39 decrypts and verifies authenticity of the distribution package received (downloaded) from the center 10 by the communication unit 38 and stored in the storage unit 37 based on the control of the control unit 39. The control unit 39 controls the software update process (various types of verification, installation, activation, or the like) of the electronic control units 40a to 40d by using the update data received (downloaded) from the center 10. Specifically, the control unit 39 transfers one or more pieces of update data (update software) downloaded in the distribution package to the target electronic control unit, and causes the target electronic control unit to install the update software based on the update data. After the installation is completed, the control unit 39 instructs the target electronic control unit to activate, that is, enable the installed update software. In this software update process, the control unit 39 appropriately controls procedures such as various types of verification, installation, and activation in the electronic control units 40a to 40d.

The electronic control units 40a to 40d are devices (ECUs) configured to control operations of individual parts of the vehicle. Although FIG. 1 shows an example in which the in-vehicle network 20 includes four electronic control units 40a to 40d, the number of electronic control units is not particularly limited. For example, a display device (human-machine interface (HMI)) for various types of display such as display of information indicating that there is update data during the software update process of the electronic control units 40a to 40d, display of an acceptance request screen for requesting acceptance of a user or administrator of the vehicle for the software update, and display of a result of the software update may be connected to the OTA master 30. Examples of the display device include a car navigation system. The number of buses connecting the electronic control units to the OTA master 30 is not particularly limited as well. For example, the display device may be connected to the OTA master 30 via a bus other than the buses 60a to 60c.

The communication module 50 has a function of controlling communication between the center 10 and the vehicle. The communication module 50 connects the in-vehicle network 20 to the center 10. The communication module 50 is wirelessly connected to the center 10 via the network 70 so that, for example, the OTA master 30 authenticates the vehicle and downloads update data. The communication module 50 may be included in the OTA master 30.

Overview of Software Update Process

For example, the OTA master 30 transmits a software update check request to the center 10 when the vehicle is powered ON. The update check request includes at least the vehicle ID for identifying the vehicle, and the vehicle configuration information. The vehicle configuration information is information related to conditions of the electronic control units (system configuration), such as hardware and current software versions of the electronic control units 40a to 40d connected to the in-vehicle network 20. The vehicle configuration information can be created by acquiring identification numbers of the electronic control units (ECU_IDs) and identification numbers of the software versions of the electronic control units (ECU_Software_IDs) from the electronic control units 40a to 40d connected to the in-vehicle network 20. The vehicle ID and the current software versions of the electronic control units 40a to 40d are used to determine whether there is software update data for the electronic control units 40a to 40d by making comparison with the latest software versions held in the center 10 for each vehicle ID. In response to the update check request received from the OTA master 30, the center 10 transmits a notification about the presence or absence of update data to the OTA master 30. When there is software update data for the electronic control units 40a to 40d, the OTA master 30 transmits a distribution package download request to the center 10. In response to the download request received from the OTA master 30, the center 10 transmits, to the OTA master 30, a distribution package (described later) including the update data and encrypted at a security level associated with the target electronic control unit based on the security information stored in the center 10. The distribution package may include, in addition to the update data, information that specifies an encryption method applied to the distribution package, verification data for verifying the authenticity of the update data, the number of pieces of the update data, type information, and various types of control information to be used during software update. The information that specifies the encryption method applied to the distribution package may be readable prior to decryption.

The OTA master 30 determines whether there is software update data for the electronic control units 40a to 40d based on the response to the update check request that is received from the center 10. The OTA master 30 decrypts and verifies authenticity of the distribution package received from the center 10 and stored in the storage device 34. The OTA master 30 transfers one or more pieces of update data downloaded in the distribution package to the target electronic control unit, and causes the target electronic control unit to install the update data. After the installation is completed, the OTA master 30 instructs the target electronic control unit to activate, that is, enable the installed updated version of software.

In an acceptance request process, the OTA master 30 causes an output device to output a notification that acceptance is required for software update, and a notification that prompts the user or administrator to input acceptance for the software update. Examples of the output device include a display device (not shown) that is provided in the in-vehicle network 20 and that provides notifications by display, and an audio output device (not shown) that provides notifications by audio. For example, when the display device is used as the output device in the acceptance request process, the OTA master 30 is capable of causing the display device to display an acceptance request screen for requesting acceptance of the user or administrator for the software update, and to display a notification that prompts the user or administrator to perform a specific input operation such as pressing of an acceptance button when accepting the software update. In the acceptance request process, the OTA master 30 is capable of causing the display device to display texts, icons, or the like for notifying that there is software update data for the electronic control units 40a to 40d, and to display restrictions during the execution of the software update process. In response to reception of the input of acceptance from the user or administrator, the OTA master 30 executes a control process for the installation and activation to update the software of the target electronic control unit.

When the non-volatile memory of the target electronic control unit is a single-bank memory having one storage area for storing data of software or the like, the installation and activation are basically executed in succession. Therefore, the acceptance request process for the software update is executed before the installation. Even when the non-volatile memory of the target electronic control unit is the single-bank memory, the target electronic control unit may be requested to temporarily stop the update process, that is, to wait for (hold) the activation after completion of the installation. When the non-volatile memory of the target electronic control unit is a dual-bank memory having two storage areas for storing data of software or the like, the acceptance request process for the software update is executed at least after the installation and before the activation. When the non-volatile memory of the target electronic control unit is the dual-bank memory, the acceptance request process for the software update before the installation may be executed or omitted.

The software update process includes a download phase, an installation phase, and an activation phase. In the download phase, the OTA master 30 downloads update data from the center 10. In the installation phase, the OTA master 30 transfers the downloaded update data to the target electronic control unit and installs update software based on the update data in the storage area of the target electronic control unit. In the activation phase, the target electronic control unit enables the installed update software.

Download is a process in which the OTA master 30 receives software update data for the electronic control unit that is transmitted from the center 10 and stores the update data in the storage unit 37. In the download, the update data is downloaded by using a distribution package encrypted at a predetermined security level described later. The download phase includes not only the execution of download, but also control of a series of processes related to the download, such as determination of whether the download can be executed, decryption of the distribution package, and verification of the updated data.

The update data transmitted from the center 10 to the OTA master 30 may include update software for the electronic control units (whole data or difference data), compressed data of the update software, or divided data of the update software or the compressed data. The update data may include an ECU_ID (or serial number) of the target electronic control unit and an ECU_Software_ID of the target electronic control unit before update. The distribution package to be downloaded may include update data for one electronic control unit or update data for a plurality of electronic control units.

Installation is a process in which the OTA master 30 writes pieces of the update software (updated version program) to the non-volatile memories of a plurality of target electronic control units in predetermined order based on the update data downloaded from the center 10. The installation phase includes not only the execution of installation, but also control of a series of processes related to the installation, such as determination of whether the installation can be executed, transfer of the update data, and verification of the update software.

When the update data includes the update software (whole data), the OTA master 30 transfers the update data (update software) to the target electronic control unit in the installation phase. When the update data includes compressed data, difference data, or divided data of the update software, the OTA master 30 may transfer the update data to the target electronic control unit, and the target electronic control unit may generate the update software from the update data. Alternatively, the OTA master 30 may generate the update software from the update data and then transfer the update software to the target electronic control unit. The update software can be generated by decompressing the compressed data or assembling (integrating) the difference data or the divided data.

The update software can be installed by the target electronic control unit based on an installation request from the OTA master 30. A specific target electronic control unit that has received the update data may autonomously install the update software without receiving an explicit instruction from the OTA master 30.

Activation is a process in which the target electronic control unit enables (activates) the update software installed in the non-volatile memory. The activation phase includes not only the execution of activation, but also a series of controls related to the activation, such as determination of whether the activation can be executed, request for acceptance of the user or administrator of the vehicle for the activation, and verification of an execution result.

The update software can be activated by the target electronic control unit based on an activation request from the OTA master 30. A specific target electronic control unit that has received the update data may autonomously execute the activation after completion of the installation without receiving an explicit instruction from the OTA master 30.

The software update process can be executed successively or in parallel for a plurality of target electronic control units.

The "software update process" herein includes not only a process of successively executing all of the download, installation, and activation, but also a process of executing only a part of the download, installation, and activation.

Processes

Next, processes to be executed in the network system according to the present embodiment will be described with reference to FIGS. 7 and 8 as well.

Figure 7:
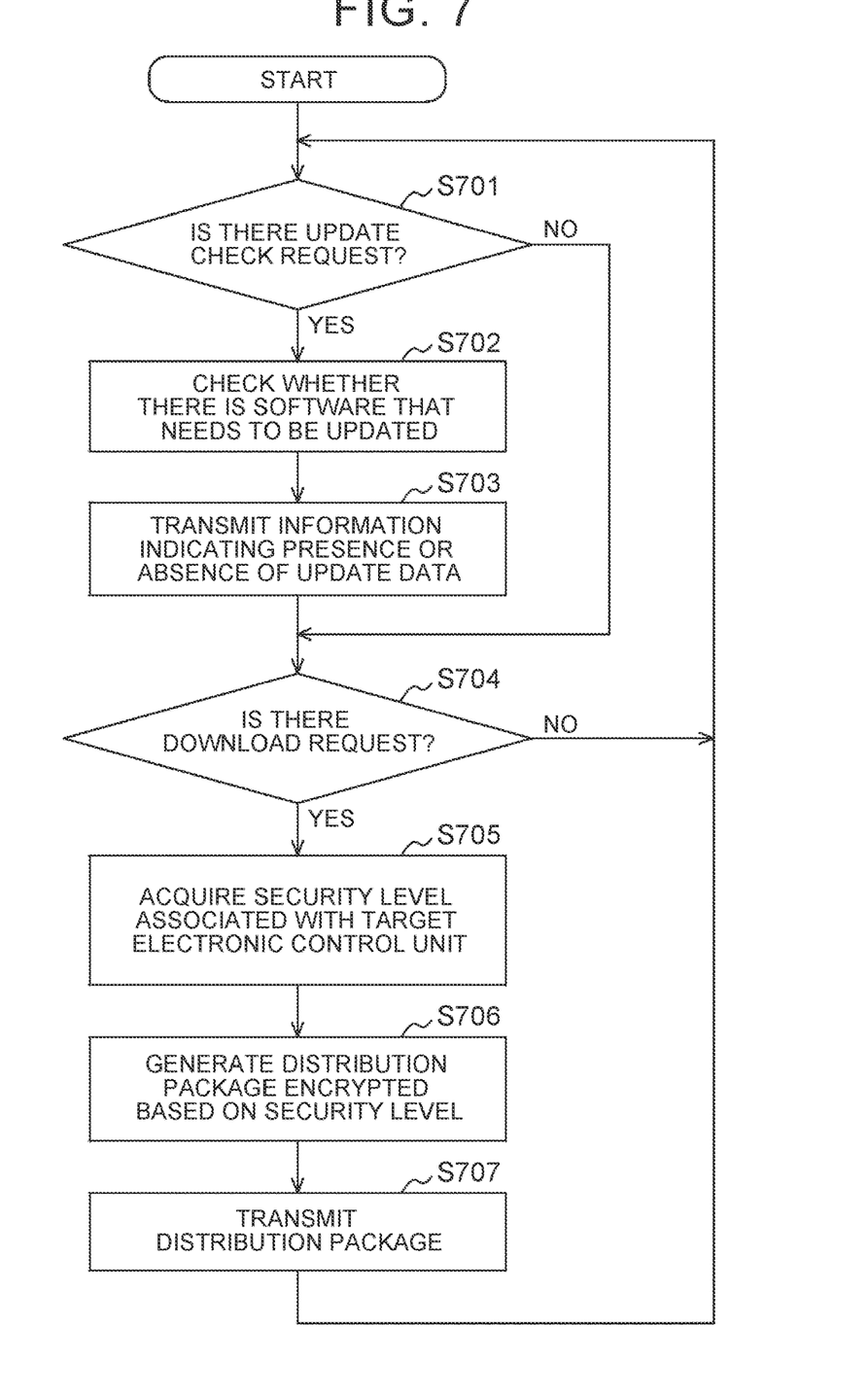
FIG. 7 is a flowchart of a distribution control process to be executed by the center.

FIG. 7 is a flowchart illustrating an example of a distribution control process to be executed by the individual components of the center 10. The distribution control process shown in FIG. 7 is started when the center 10 receives an update check request transmitted by the OTA master 30.

Step S701

The control unit 18 of the center 10 determines whether there is a software update check request (received) from the OTA master 30. When there is an update check request (Step S701: YES), the process proceeds to Step S702. When there is no update check request (Step S701: NO), the process proceeds to Step S704.

Step S702

The control unit 18 of the center 10 checks whether there is software that needs to be updated. This check is made by comparing current software versions of the electronic control units 40*a* to 40*d* on the vehicle that are acquired from the vehicle configuration information in the update check request and the latest software versions stored in the storage unit 16 of the center 10. When the check is made as to whether there is software that needs to be updated, the process proceeds to Step S703.

Step S703

The control unit 18 of the center 10 determines whether there is software update data for the electronic control units 40*a* to 40*d* mounted on the vehicle in the update check request based on the update management information stored in the storage unit 16 of the center 10. Based on a determination result, the control unit 18 of the center 10 transmits information indicating the presence or absence of update data to the OTA master 30. When the information indicating the presence or absence of update data is transmitted, the process proceeds to Step S704.

Step S704

The communication unit 17 of the center 10 determines whether there is a distribution package download request from the OTA master 30. When there is a download request (Step S704: YES), the process proceeds to Step S705. When there is no download request (Step S704: NO), the process proceeds to Step S701.

Step S705

The control unit 18 of the center 10 acquires, based on the security information stored in the storage unit 16 of the center 10, a security level associated with an electronic control unit for which determination is made that there is software update data, that is, the target electronic control unit. For example, when only an electronic control unit A is the target electronic control unit in the example of FIG. 4, "Level 1" associated with the electronic control unit A is acquired as the security level of the distribution package. For example, when a plurality of electronic control units A, B, and C is the target electronic control units, "Level 3" that is the highest security level among a security level 1 associated with the electronic control unit A, a security level 2 associated with the electronic control unit B, and a security level 3 associated with the electronic control unit C is acquired as the security level of the distribution package. When the security level associated with the target electronic control unit is acquired, the process proceeds to Step S706.

Step S706

The control unit 18 of the center 10 generates a distribution package encrypted with a strength associated with the acquired security level as a distribution package including update data to be transmitted to the OTA master 30. As an example of the encryption, when the security level is equal to or higher than a predetermined threshold (high level), the distribution package is encrypted based on information (key) unique to the vehicle. When the security level is lower than the predetermined threshold (low level), the distribution package can be encrypted based on information (key) common to a plurality of vehicles. The information unique to the vehicle for use when the security level is equal to or higher than the predetermined threshold may be generated by using vehicle identification information such as a vehicle identification number (VIN), or the encryption may be performed differently for each VIN (for each vehicle). The distribution package may include information that specifies an encryption method. When the distribution package encrypted based on the security level associated with the target electronic control unit is generated, the process proceeds to Step S707.

Step S707

The communication unit 17 of the center 10 transmits, to the OTA master 30, the distribution package encrypted based on the security level associated with the target electronic control unit. When the distribution package is transmitted, the process proceeds to Step S701.

The embodiment described above is directed to the example in which the center 10 generates the distribution package encrypted based on the security level associated with the target electronic control unit at the timing of reception of the request from the OTA master 30. The center 10 may generate in advance a distribution package encrypted based on a security level associated with all the target electronic control units at a timing when the update data is registered in the center 10. In the embodiment described above, when the electronic control units A, B, and C are the target electronic control units in Step S705, the control unit 18 acquires "Level 3" that is the highest security level as the security level of the distribution package. The control unit 18 may acquire the security levels of the electronic control units A, B, and C. In this case, the control unit 18 may create, in Step S706, distribution packages at the acquired security levels for the individual pieces of update data of the electronic control units A, B, and C.

Figure 8:
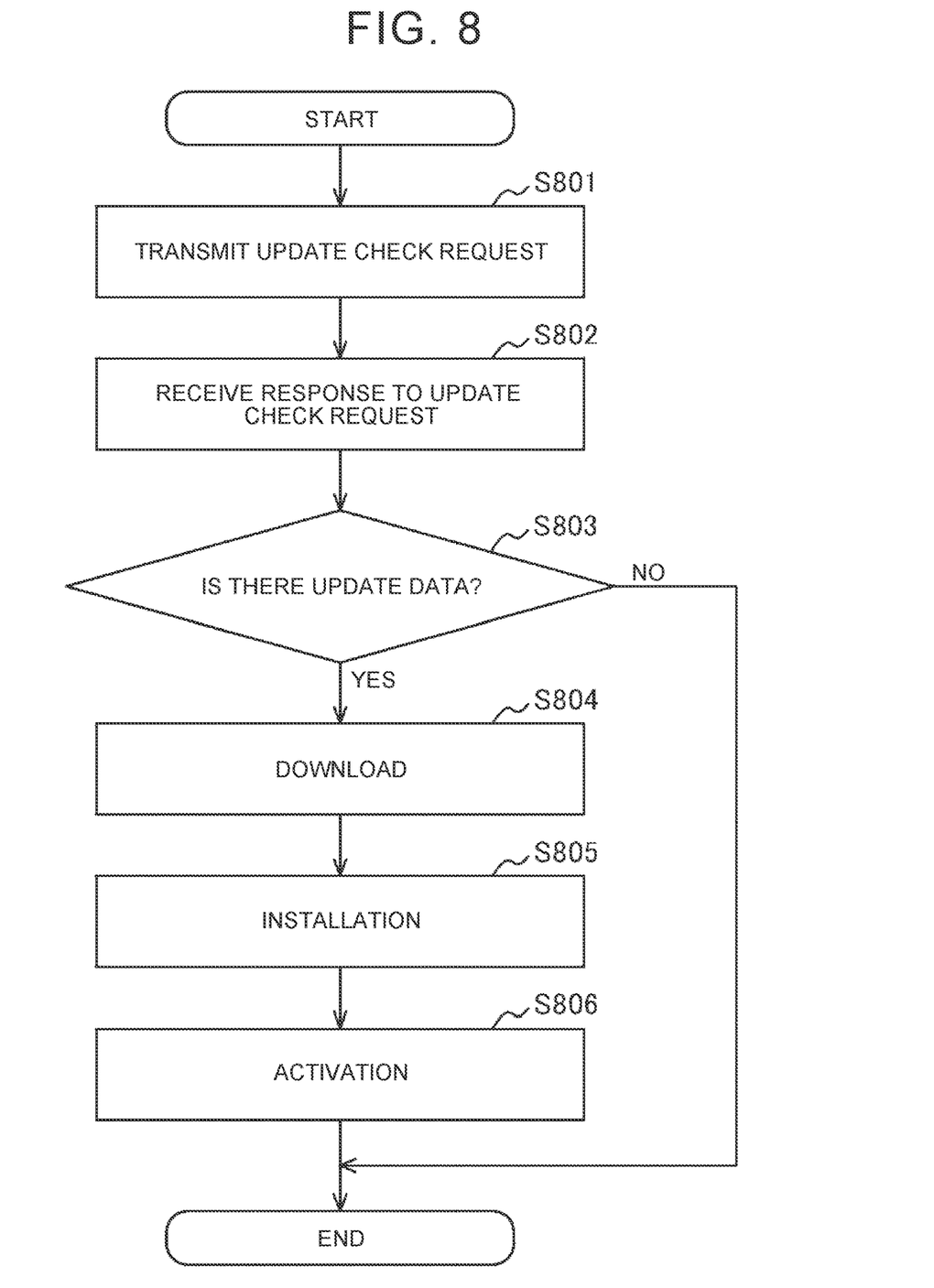
FIG. 8 is a flowchart of a software update control process to be executed by the OTA master.

FIG. 8 is a flowchart illustrating an example of a software update control process to be executed by the individual components of the OTA master 30. For example, the software update control process shown in FIG. 8 is executed when the vehicle is powered ON.

Step S801

The communication unit 38 of the OTA master 30 transmits, to the center 10, an update check request as to whether there is software update data for the electronic control units 40a to 40d. The update check request includes the vehicle ID and current software versions of the electronic control units 40a to 40d. When the update check request is transmitted to the center 10, the process proceeds to Step S802.

Step S802

The communication unit 38 of the OTA master 30 receives a response to the update check request from the center 10. When the response to the update check request is received, the process proceeds to Step S803.

Step S803

The control unit 39 of the OTA master 30 determines whether there is software update data for at least one of the electronic control units 40a to 40d based on the response to the update check request that is received by the communication unit 38 of the OTA master 30. When there is at least one piece of software update data (Step S803: YES), the process proceeds to Step S804. When there is no software update data (Step S803: NO), the software update control process is terminated.

Step S804

The control unit 39 of the OTA master 30 downloads the update data. More specifically, the communication unit 38 of the OTA master 30 transmits a download request for a distribution package including the update data to the center 10, and receives a distribution package transmitted from the center 10 in response to the download request. The communication unit 38 stores the received distribution package in the storage unit 37 of the OTA master 30. When the update data is downloaded, the process proceeds to Step S805.

Step S805

The control unit 39 of the OTA master 30 executes software installation for the target electronic control unit based on the update data. More specifically, the control unit 39 transfers the update data in the distribution package to the target electronic control unit, and instructs the target electronic control unit to install update software. The target electronic control unit writes the update data received from the OTA master 30 to the data storage area. When the update software is installed, the process proceeds to Step S806.

Step S806

The control unit 39 of the OTA master 30 activates (gives an instruction to activate) the update software installed in the target electronic control unit. More specifically, the control unit 39 instructs the target electronic control unit that has written the update software to the data storage area to activate the update software. The target electronic control unit is restarted and executes the update software when a specific input operation such as powering OFF is performed. When the activation process for the update software is executed, the software update control process is terminated.

Effects

As described above, in the network system according to the embodiment of the present disclosure, the center pre-stores the information (security information) in which the electronic control units mounted on the vehicle and the security levels required for software update are associated with each other. When the center receives the update data download request from the OTA master, the center generates the distribution package encrypted at the security level associated with the electronic control unit to be updated (target electronic control unit), and transmits the distribution package to the OTA master. With this process, the software update can appropriately be executed at the security level associated with the target electronic control unit.

The distribution package may include information that specifies an encryption method applied to the distribution package. With this information, the OTA master that has received the distribution package can easily decrypt the distribution package.

When the security level associated with the target electronic control unit is equal to or higher than the predetermined threshold, that is, the required security level is high, falsification or the like can be suppressed by performing encryption based on the information unique to the vehicle. When the security level associated with the target electronic control unit is lower than the predetermined threshold, that is, the required security level is low, the encryption is performed based on the information common to a plurality of vehicles to facilitate decryption of the distribution package. Thus, the period required for software update can be shortened.

Although the embodiment of the technology of the present disclosure has been described above, the present disclosure can be understood not only as the center but also as, for example, an OTA master communicable with the center, a method to be executed by a center or an OTA master including a processor and a memory, a program, a non-transitory computer-readable storage medium storing the program, or a vehicle including an OTA master. The center may include one or more processors. The OTA master may include one or more processors.

The technology of the present disclosure can be used in a network system for updating software of an electronic control unit.

What is claimed is:

1. A center configured to communicate with an over-the-air (OTA) master configured to control software update for electronic control units mounted on a vehicle, the center comprising one or more processors configured to:
   store security information in which security levels required for the software update are associated with the electronic control units mounted on the vehicle, respectively; and
   generate a distribution package with encryption applied at a security level associated with a target electronic control unit based on the security information,
   wherein the target electronic control unit is an electronic control unit that is a target of the software update, and
   wherein the one or more processors are further configured to, when the security level associated with the target electronic control unit is equal to or higher than a predetermined threshold, generate the distribution package with the encryption based on information unique to the vehicle.

2. The center according to claim 1, wherein the one or more processors are further configured to:
   receive, from the vehicle, version information indicating a version of software of each of the electronic control units;
   determine whether the target electronic control unit is present based on the version information;
   when the one or more processors determine that the target electronic control unit is present based on the version information, generate the distribution package with the encryption applied at the security level associated with the target electronic control unit based on the security information; and transmit the distribution package to the OTA master based on a request from the OTA master.

3. The center according to claim 1, wherein the one or more processors are further configured to generate the distribution package including information that specifies a method for the encryption.

4. The center according to claim 1, wherein the one or more processors are further configured to, when the security level associated with the target electronic control unit is lower than a predetermined threshold, generate the distribution package with the encryption based on information common to a plurality of vehicles.

5. The center according to claim 1, further comprising a non-transitory computer-readable storage medium storing instructions that are executable by the one or more processors and that cause the one or more processors to perform functions including:
storing the security information in which the security levels required for the software update are associated with the electronic control units mounted on the vehicle, respectively; and
generating the distribution package with the encryption applied at the security level associated with the target electronic control unit based on the security information.

6. An over-the-air (OTA) master configured to control software update for electronic control units mounted on a vehicle, the OTA master comprising one or more processors configured to:
receive, from a center, a distribution package with encryption applied at a security level associated with a target electronic control unit, wherein the target electronic control unit is an electronic control unit that is a target of the software update; and
control the software update for the target electronic control unit based on the distribution package,
wherein the one or more processors are further configured to, when the security level associated with the target electronic control unit is equal to or higher than a predetermined threshold, generate the distribution package with the encryption based on information unique to the vehicle.

7. The OTA master according to claim 6, wherein the one or more processors are further configured to:
transmit, to the center, version information indicating a version of each of the electronic control units mounted on the vehicle; and
receive, from the center, the distribution package with the encryption applied at the security level associated with the target electronic control unit based on the version information.

8. The OTA master according to claim 6, wherein the one or more processors are further configured to decrypt the distribution package based on information that is included in the distribution package and specifies a method for the encryption.

9. The OTA master according to claim 6, wherein the one or more processors are further configured to decrypt the distribution package based on information unique to the vehicle.

10. The OTA master according to claim 6, wherein the one or more processors are further configured to decrypt the distribution package based on information common to a plurality of vehicles.

11. The OTA master according to claim 6, further comprising a non-transitory computer-readable storage medium storing instructions that are executable by the one or more processors and that cause the one or more processors to perform functions including:
receiving, from the center, the distribution package with the encryption applied at the security level associated with the target electronic control unit; and
controlling the software update for the target electronic control unit based on the distribution package.

12. A vehicle comprising the OTA master according to claim 6.

13. A method to be executed by a center configured to communicate with an over-the-air (OTA) master configured to control software update for electronic control units mounted on a vehicle, the OTA master including one or more processors and a memory, the method comprising:
storing security information in which security levels required for the software update are associated with the electronic control units mounted on the vehicle, respectively; and
generating a distribution package with encryption applied at a security level associated with a target electronic control unit based on the security information,
wherein the target electronic control unit is an electronic control unit that is a target of the software update, and
wherein the one or more processors are further configured to, when the security level associated with the target electronic control unit is equal to or higher than a predetermined threshold, generate the distribution package with the encryption based on information unique to the vehicle.

14. A method to be executed by an over-the-air (OTA) master configured to control software update for electronic control units mounted on a vehicle, the OTA master including one or more processors and a memory, the method comprising:
receiving, from a center, a distribution package with encryption applied at a security level associated with a target electronic control unit, wherein the target electronic control unit is an electronic control unit that is a target of the software update; and
controlling the software update for the target electronic control unit based on the distribution package,
wherein the one or more processors are further configured to, when the security level associated with the target electronic control unit is equal to or higher than a predetermined threshold, generate the distribution package with the encryption based on information unique to the vehicle.

* * * * *